United States Patent
Tarn (10) Patent No.: US 9,951,530 B2
(45) Date of Patent: Apr. 24, 2018

(54) METHOD FOR PRODUCING LAMINATE FLOORBOARDS HAVING EDGES FOLLOWING THE NATURAL CURVATURE OF THE WOODEN MATERIAL

(71) Applicant: Bole OÜ, Paldiski, Harju (EE)

(72) Inventor: Hannes Tarn, Harju (EE)

(73) Assignee: BOLE OU, Paldiski (EE)

( * ) Notice: Subject to any disclaimer, the term of this patent is extended or adjusted under 35 U.S.C. 154(b) by 0 days.

(21) Appl. No.: 14/895,113

(22) PCT Filed: Jun. 3, 2014

(86) PCT No.: PCT/EP2014/061426
§ 371 (c)(1),
(2) Date: Dec. 1, 2015

(87) PCT Pub. No.: WO2014/195281
PCT Pub. Date: Dec. 11, 2014

(65) Prior Publication Data
US 2016/0123020 A1 May 5, 2016

(30) Foreign Application Priority Data

Jun. 7, 2013 (EE) .................................. 201300022

(51) Int. Cl.
*E04F 15/04* (2006.01)
*B32B 37/14* (2006.01)
(Continued)

(52) U.S. Cl.
CPC ............ *E04F 15/045* (2013.01); *B32B 37/14* (2013.01); *B32B 38/0004* (2013.01);
(Continued)

(58) Field of Classification Search
CPC . B32B 2419/00; B32B 37/14; B32B 38/0004; E04F 15/02038; E04F 15/042; E04F 15/045; E04F 2203/02
(Continued)

(56) References Cited

U.S. PATENT DOCUMENTS 5,094,282 A 3/1992 Suzuki et al.
2006/0073320 A1* 4/2006 Pervan .................... B05C 1/006
428/292.4
(Continued)

FOREIGN PATENT DOCUMENTS

CH 698 020 B1 4/2009
DE 298 12 919 U1 12/1998
(Continued)

OTHER PUBLICATIONS

"Making a Bolefloor", Aug. 1, 2012 (Aug. 1, 2012), XP054975457, Retrieved from the internet: https://www.youtube.com/watch?v=x_YlnbBLBJE [retrieved on Dec. 24, 2016].*
(Continued)

*Primary Examiner* — George Koch
(74) *Attorney, Agent, or Firm* — Ladas & Parry LLP (57) ABSTRACT

The present invention relates to a method for producing laminate floorboards having edges following the natural curvature of veneer planks cut from timber planks with natural curvature. With the method laminate floorboards are obtained, each floorboard comprising a veneer plank glued onto a substrate, the contour of the substrate and the veneer corresponding with each other.

11 Claims, 6 Drawing Sheets

(51) Int. Cl.
*B32B 38/00* (2006.01)
*E04F 15/02* (2006.01)

(52) U.S. Cl.
CPC ...... *E04F 15/02038* (2013.01); *E04F 15/042* (2013.01); *B32B 2419/00* (2013.01); *E04F 2203/02* (2013.01)

(58) Field of Classification Search
USPC .......................................... 156/64
See application file for complete search history.

(56) References Cited

U.S. PATENT DOCUMENTS

| | | | |
|---|---|---|---|
| 2006/0260264 A1 | 11/2006 | Reynolds | |
| 2015/0231794 A1* | 8/2015 | Lacroix | B27L 5/08 144/118 |

FOREIGN PATENT DOCUMENTS

| | | | | |
|---|---|---|---|---|
| DE | 102007006631 A1 * | 2/2007 | ............. | E04F 13/10 |
| DE | 10 2007 006631 A1 | 8/2007 | | |
| EP | 1437456 A1 * | 7/2004 | ............. | B27M 3/04 |
| EP | 2 295 215 A1 | 3/2011 | | |
| WO | WO 2006005209 A1 * | 1/2006 | ............. | B27C 5/003 |
| WO | 2009/139638 A2 | 11/2009 | | |
| WO | 2010/022493 A1 | 3/2010 | | |
| WO | WO 2010022493 A1 * | 3/2010 | ............. | B27B 1/007 |

OTHER PUBLICATIONS

Written Opinion in PCT/EP2014/061426, Retrieved from the internet: https://patentscope.wipo.int/search/docservicepdf_pct/id00000027391909/WOSA/WO2014195281.pdf [retrieved on Dec. 24, 2016].*
"Life is not a straight line", Bolefloor marketing pamphlet, cited in PCT search report, published Jul. 18, 2012.*
Translation of DE 102007006631 A1, Feb. 2007, Germany, Herrmann, Dieter Karsten.*
Translation of WO 2006005209 A1, Jan. 2006, Switzerland, Herzog-Schymura Petra.*
"Making a Bolefloor", Aug. 1, 2012 (Aug. 1, 2012), XP054975457, Retrieved from the Internet: URL:http://www.youtube.com/watch?v=x_YlnbBLBJE [retrieved on Jul. 17, 2014] the whole document.
"Das Leben ist keine Gerade", Jul. 18, 2012 (Jul. 18, 2012), XP055130111, Retrieved from the Internet: URL:http://www.joerg-waidelich.de/pdf/bole_floor_2012 [retrieved on Jul. 18, 2014].
CH 698 020 B1_English_Abstract.
DE 10 2007 006631 A1_English_Abstract.
EP 2 295 215 A1_English_Abstract.

* cited by examiner

METHOD FOR PRODUCING LAMINATE FLOORBOARDS HAVING EDGES FOLLOWING THE NATURAL CURVATURE OF THE WOODEN MATERIAL

RELATED APPLICATION

This application is a national phase entry under 35 USC 371 of International Patent Application No PCT/EP2014/061426 filed on 3 Jun. 2014, which claims priority from Estonian Application No. P201300022 filed on 7 Jun. 2013, the disclosures of which is incorporated in their entirety by reference herein.

TECHNICAL FIELD

Present invention relates to a method for producing laminate floorboards having edges following the natural curvature of the wooden material.

BACKGROUND ART

In the prior art there are several solutions known for manufacturing floorboards, floor panels or other panels with edges following natural curvature of the wooden material.

Swiss patent CH698020B1 (Peter Herzog-Schymura, publ. 30 Apr. 2009) discloses a process of manufacturing solid wooden boards from multiple adjacent wooden elements, which are connected by the edges along the connecting lines following as closely as possible the natural curvature of the elements. The wooden board to be manufactured is for example a table top, a flooring element (i.e. floor panel) or a planar furniture element, etc.

European patent application EP2295215A1 (Rudolf Meyer, publ. 16 Mar. 2011) discloses a method and device for manufacturing solid wood plates from unedged timber planks. The device comprises a detection unit such as a digital camera, which is used for scanning unedged planks and said data is stored in a computer database, and a computer device for calculating on the basis of the data stored in the computer database a cutting line for two adjacent planks having a curvilinear edge. The device includes a cutting device for cutting out said cutting lines and a corresponding working station for joining said cut planks into plates.

German utility model DE29812919U1 (Willi Schmidt, publ. 17 Dec. 1998) discloses plates made of several planks having curvilinear edges, where two adjacent planks include for a tongue-and-groove joint at the edge of one plank a tongue and the other plank includes a groove at the corresponding edge.

German patent application DE102007006631A1 (Dieter Karsten Herrmann, publ. 16 Aug. 2007) discloses a process for manufacturing of flooring, wall or ceiling covering from the planks having natural curvature. In this solution every single plank also is scanned and the data obtained so is stored in the computer database. The data obtained by scanning includes among other things the full-size image of the plank. For example by using CAD-program scanned images of the planks are placed on the floor area image to be covered and into the edges of the adjacent planks cutting lines are generated in a semiautomatic or full-automatic mode. Every single plank is then cut out in the CNC cutting machine according to the cutting lines.

DISCLOSURE OF INVENTION

The aim of the present invention is to provide a method for producing laminate floorboards having edges following the natural curvature of the wooden material, where in the manufacturing stage of laminate floorboards the machining of said floorboards is minimized as much as possible by carefully selecting and matching the shapes of the wooden material used.

The aim of the present invention is also to enable more efficient use of the wooden material by matching of the shapes of the wooden material. This in turn reduces the amount of wooden residues such as sawdust and chips generated in the process and it also prolongs the lifetime of the cutting instruments used, which in turn reduces the downtime. This also reduces the overall energy consumption of the process.

Present invention relates to a method for producing laminate floorboards having edges following the natural curvature of the wooden material, which comprises steps, wherein:

a) the material for producing laminate floorboards is prepared by scanning the contour data and the images of the timber planks into the computer database, when unedged timber planks having natural edge curvature are used, said data comprising at least the data of the length, width, thickness and edge contours of the plank and the timber planks are cut lengthwise into veneer planks in equal thickness, or by scanning the contour data of the veneer planks along with the images of the veneer planks into the computer database, when using veneer planks having natural edge curvature, at that said data comprises at least the data of the length, width, thickness and edge contours of the veneer plank.

In other words according to the first preferred embodiment of the invention in step a) the material for producing laminate floorboards is prepared on the basis of the unedged timber planks having natural curvature, where contour data and images of the timber planks are scanned into the computer database, said data comprising at least the data of the length, width, thickness and edge contours of the planks and then said timber planks are cut lengthwise into veneer planks in equal thickness.

And in other words according to the second preferred embodiment of the invention in step a) the material for producing laminate floorboards is prepared on the basis of veneer planks having natural edge curvature, where the contour data of the veneer planks along with the images of veneer planks is scanned into the computer database, said data comprising at least the data of the length, width, thickness and edge contours of the plank.

In other word in the second preferred embodiment of the invention in the first step a) instead of using unedged timber planks having natural curvature (according to the first embodiment of the invention), in the first step a) veneer planks are used, which are obtained for example from the same trunk as consecutively sliced veneer planks (so called lamellae pack).

According to yet another preferred embodiment of the invention the data mentioned above comprises also data about bark, pith, heartwood and wane contours as well as about wood defects.

According to yet another preferred embodiment of the invention in the computer database there is stored information for each plank about its delivery and origin and other metadata, for example the existence of FSC (The Forest Stewardship Council®) certificate etc.

Next (step b) a preliminary layout array of the veneer planks is generated, which provides a number of rows of veneer planks to cover the given floor area and for each row a preferred width of the veneer planks.

In other words in step b) for the floor area (or other area) to be covered on the basis of the veneer planks widths in the computer database (which are obtained with the help of the contour data of the scanned timber planks) and for choosing veneer planks into different rows on the floor, a preliminary layout array is generated, which provides a number of rows of veneer planks to cover the given floor area and for each row a preferred width of the veneer planks.

The purpose of this preliminary layout array is to ensure that when veneer planks having natural curvature are placed into the rows, those rows do not skew, which in the worst case scenario means that on the floor of the room the number of the veneer plank ends against one wall is different from the number of veneer plank ends against the opposite wall. In other words this preliminary layout array restricts the direction of the veneer plank rows.

The preferred width or widths are selected according to the actual existing width distribution of the veneer planks in the warehouse of the wooden material, that is widths of the veneer planks in the warehouse (according to the data of the scanned veneer planks in the computer database) are distributed according to the widths into different groups (into so-called width classes). The number of rows and widths of the rows covering the floor area in the preliminary layout array can be selected according to the technical limitations or technical consideration (for example the position of the door openings, posts, stove, fireplace, etc.) or in addition according to the preferences of the designer or client or for example according to the aesthetic preferences.

Whatever considerations are to determine the number of rows and widths in the preliminary layout array, it defines for the next step technical parameters according to which the veneer planks are selected into each row.

Next (in step c) on the basis of the contour data of the edges of the veneer planks of the timber planks in the computer database a set of veneer planks with edges having natural curvature covering the pre-determined floor area is generated, where during selection of veneer planks according to the preliminary layout array into the subsequent row of the veneer planks, the edge contour of this row is matched with the edge contour of the previous row according to the minimal and maximum overlap determined by the preliminary layout array, in every single row also the ends of the veneer planks are matched according to the predetermined minimal and maximum overlap and said operations are repeated for every following row of the veneer planks until the whole pre-determined floor area is covered by planks.

Next (in step d) in the overlap area of every adjacent row of the veneer planks a common cutting line on the edges of the adjacent veneer planks is generated, also in the single row of veneer planks in the overlap area of ends of the two consecutive veneer planks a common cutting line on the ends of the consecutive veneer planks is generated.

Next (in step e) according to the cutting lines generated in the previous step d), for every veneer plank a substrate is generated following the contour of the veneer plank determined by the cutting lines on the edges and ends of the veneer plank, whereby for forming a tongue-and-groove joint an additional material portion is added at least into one longer edge and one shorter edge of the substrate.

In the preferred embodiment in step e) according to the cutting lines generated in the step d) for every veneer plank a substrate is generated following the contour of the veneer plank determined by the cutting lines on the edges and ends of the veneer plank such that the substrate is slightly larger (i.e. the contour of the substrate is outside the area of the veneer plank delimited by generated cutting lines), which takes into account for example the positioning tolerances when placing the veneer plank onto the substrate, whereby for forming a tongue-and-groove joint an additional material portion, when needed, is added at least into one longer edge and one shorter edge of the substrate.

In the next step (step f) for every veneer plank a substrate having a shape generated in step e) is cut out.

Next (in step g) the veneer plank and its corresponding cut-out substrate are glued together.

In the preferred embodiment the veneer plank and the corresponding substrate is placed one above the other in the correct position with the help of a laser or image projector. Without this measure the smaller substrate can end up in a wrong position under the larger veneer plank.

In the next step (step h) after the veneer plank and its substrate are glued together, the edges of every floorboard are cut so that on the edges of a ready floorboard the edges of the veneer plank follow the cutting lines on the edges and ends generated in step d) for the veneer plank and into the four edges of the substrate a corresponding tongue and groove following the cutting line of the substrate is cut for mutual joining of ready floorboards along their cutting lines.

Preferably plywood, fibreboard or chipboard is used as a substrate.

In the preferred embodiment of the invention in the step c) in every single row the ends of the veneer planks are matched according to the predetermined minimal and maximum overlap so that the junction of the ends of the veneer planks in the next row are not closer to the junction of the ends of the veneer planks in the previous row than the width of the butting ends of the veneer planks in the previous row.

For this purpose a fixed numeric value can be used, which is selected by the operator and which generally is equal or larger than the average width of the ends of the veneer planks.

Same criterion (but with less constraint) is applied for the minimal required distance from the end joint of the veneer planks in the one before the previous row of veneer planks. This way preventing the joints of the adjacent veneer plank rows from getting too close to each other.

According to the preferred embodiment of the invention in step a) the data of the unedged timber planks or veneer planks having natural curvature scanned into the computer database include at least the image of the narrower side of a timber plank or veneer plank and in the most preferred embodiment the data include images of both the sides of a timber plank or veneer plank, which enables generation of a 3D model and enables to take into account the unedged edges and pith wood of the timber plank or veneer plank.

Preferably in step c) the generation of the set of veneer planks and matching of the edge contours of the veneer planks of the subsequent rows with the edge contours of the previous rows according to the minimal and maximum overlap are carried out automatically with the help of a computing device (computer or computers) by the control program.

Preferably in the selection process of the veneer planks into the rows, which is carried out automatically by the control program, there exists an option for a manual intervention and when necessary, select veneer planks into one or more rows manually by the operator.

Preferably in step d) the generation of the common cutting line into the edges of the adjacent veneer planks is carried out automatically with the help of a computing device (computer or computers) by the control program.

Preferably in the generation process of the cutting lines, which is carried out automatically by the control program, there exists an option for a manual intervention by the operator and when necessary for a change of the position and location of veneer planks in the two or more adjacent rows and for correction of the cutting lines on the edges manually by the operator.

BRIEF DESCRIPTION OF DRAWINGS

Next the method according to the present invention is described with the help of the exemplary embodiment with references to the attached schematic drawings, where.

MODE(S) FOR CARRYING OUT THE INVENTION

First step for implementing the method according to the first embodiment of the invention comprises a step for preparing the unedged timber planks, which involves removing bark from the edges of the timber planks, cross-cutting the split ends and feeding timber planks through a thicknessing machine, to be followed by crosscutting and rejecting of the timber planks on the basis of defects.

Next the contour data with the images of the timber planks are scanned into the computer database, comprising at least the data of the length, width, thickness and edge contours of the plank, additionally, for example, data about bark, pith, heartwood and wane contours as well as wood defects.

Delivery and origin information and other metadata for instance the existence of FSC certificate etc. for every single plank are also stored in the computer database.

Then timber planks are cut lengthwise into veneer planks in equal thickness.

Rejection of defective timber planks can be implemented automatically after the defects have been identified by the scanner.

Every single timber plank is labelled for later identification whereupon these are sorted into bunches, which also are labelled for later identification.

The timber planks sorted in bunches are cut, in other words they are sliced lengthwise into veneer planks or lamellae in equal thickness. Veneer planks are labelled and stored as bunches, which are also labelled.

A first step for implementing the method according to the second embodiment of the invention comprises scanning of veneer lamellae or in other words veneer planks sliced consecutively from the same trunk. In this case the scanned data stored into the computer database also comprises at least the data of the length, width, thickness and edge contours of the plank, additionally for example data about bark, pith, heartwood and wane contours and wood defects.

The perimeter of the floor area is recorded, that is the floor area to be covered with veneer planks with the edges following natural curvature is defined.

This is done in a computer with the help of the CAD program, for example.

Then additional limiting parameters are specified, such as a type of wood (oak, maple, etc.), whether the pith wood is allowed at the edges of the veneer planks or not, the minimal and/or maximum width and/or length of a veneer plank, etc.

Also the minimal and maximum overlap of the edges of two adjacent veneer planks and minimal and maximum overlap of the ends of two consecutive veneer planks are specified. The allowed difference between the widths of the ends can also be specified, for instance.

Subsequently a distribution model according to width classes of the veneer planks for the predetermined floor area is generated on the basis of the inventory status of the veneer planks in the computer database according to their width classes or on the basis of other parameters, for instance on aesthetic parameters.

Figure 1:
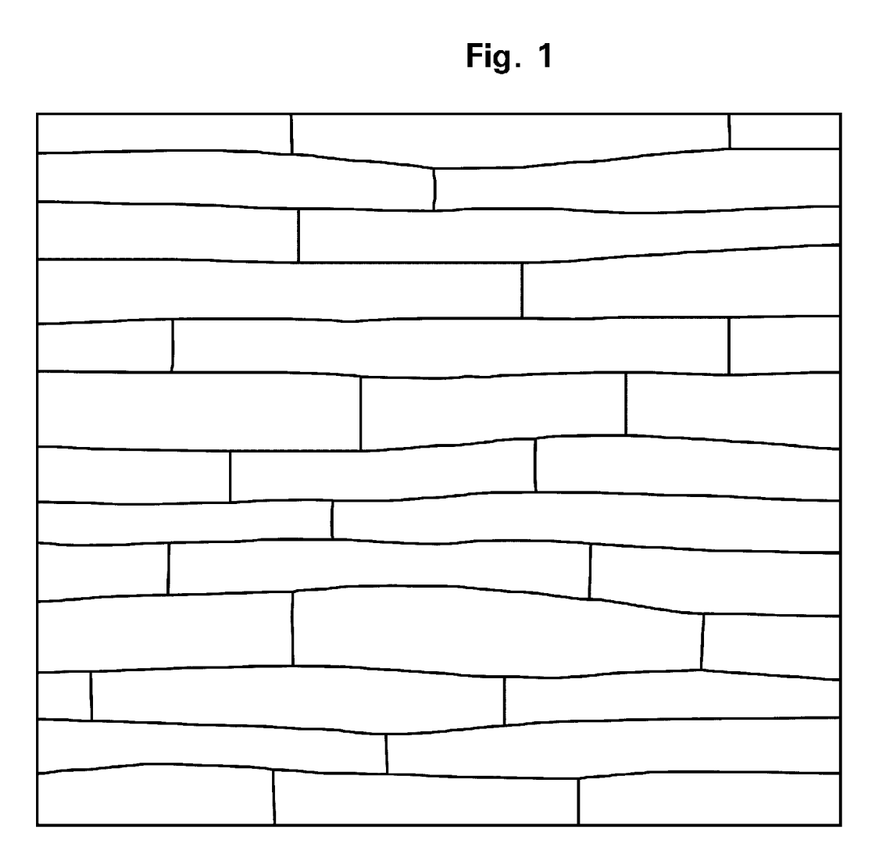
FIG. 1 shows a floor covered according to the invention by the laminate floorboards with the edges following natural curvature of the timber planks.
Figure 2:
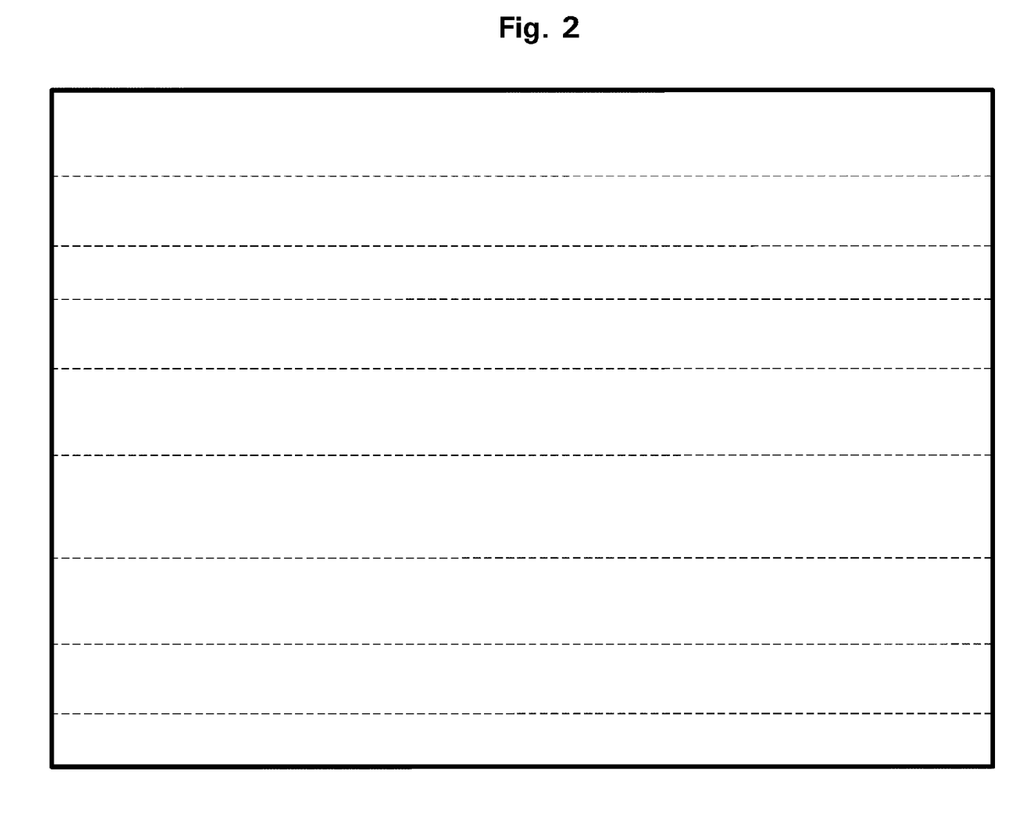
FIG. 2 shows a preliminary layout array.
Figure 3:
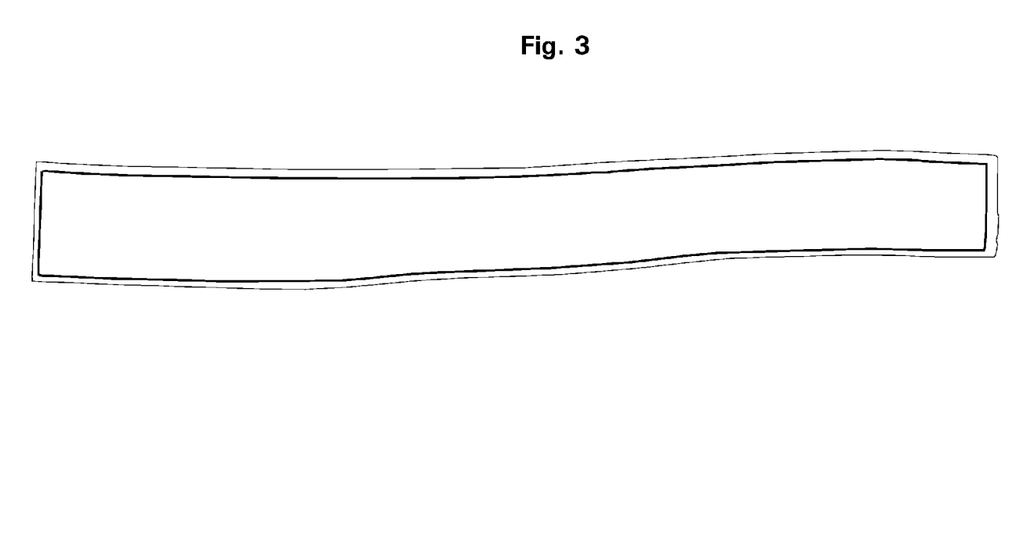
FIG. 3 shows a veneer plank having at the edges contours of the pith (i.e. the outer contour of sapwood shown by a thin line) and heartwood (the inner contour shown by a thick line)
Figure 4:
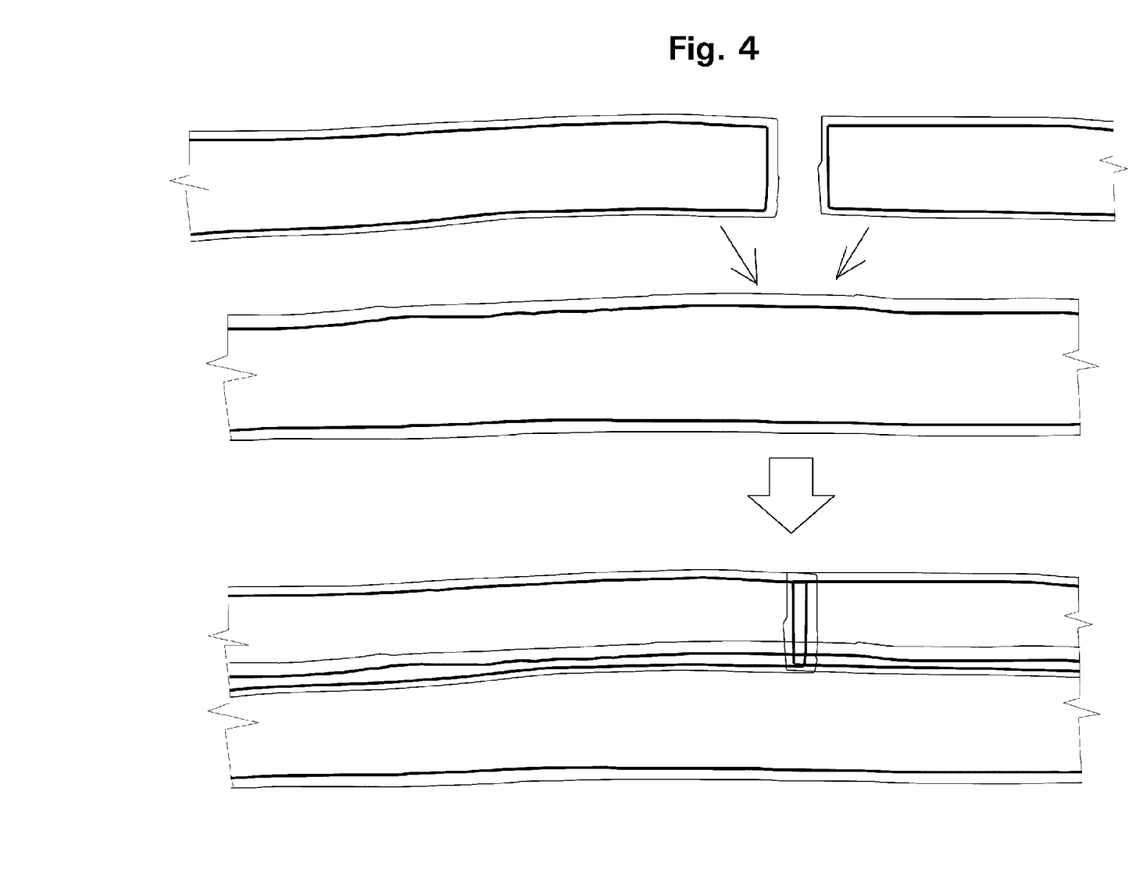
FIG. 4 shows three veneer planks (on the left) which after being placed adjacently in an overlapping manner (on the right) create overlap areas.
Figure 5:
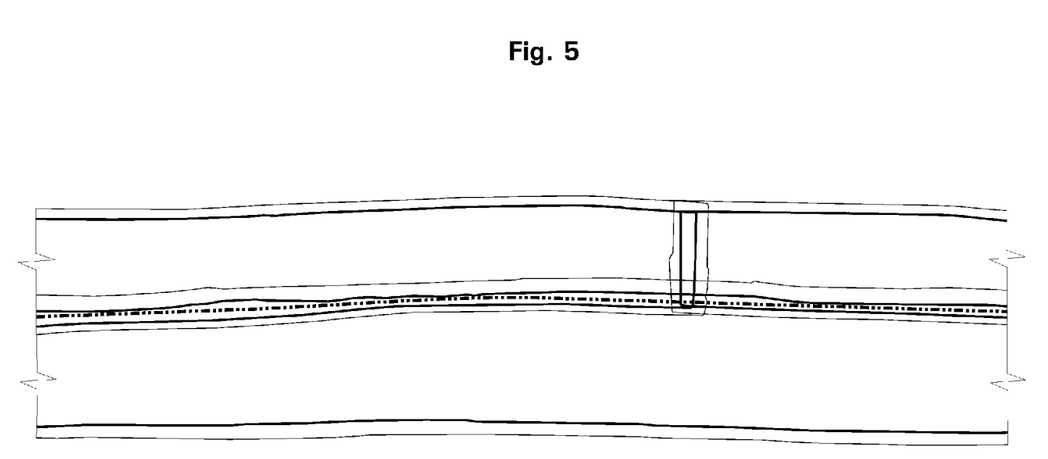
FIG. 5 shows formation of the horizontal cutting line (double point dashed line) into an overlap area of three adjacent veneer planks according to FIG. 4 at their longer edges.

For this purpose a so-called preliminary layout array is formed, which is shown on FIG. 2.

In the next step on the basis of the edge contour data of the veneer planks of the timber planks in the computer database, for covering the predetermined floor area, a set of veneer planks with the edges following natural curvature is generated.

In doing so, a preliminary layout array is taken into account, specifying a preferred initial width for every row.

This is implemented with the help of the customized CAD program module, i.e. a control program, which searches from the computer database the veneer planks which correspond to the predetermined limiting parameters.

When selecting veneer planks for every next row, the edge contour of the given row is matched with the edge contour of the previous row according to the predetermined minimum as well as maximum overlap and every single row ends of the veneer planks are matched according to the predetermined minimum as well as maximum overlap. Those operations are related with the preliminary layout array, which specifies, as mentioned above, for every single row its preferred width and overlap at the edges.

In this step the selection and matching of veneer planks for the corresponding row is performed so that the end joint of two veneer planks in the next row is not closer than the width of the butting ends of the veneer planks in the previous row.

For this purpose a fixed value of variable can be used, which is selected by the operator, this could be 50 cm, for instance, or any other numerical value.

Same criterion with less strict limitation applies to the required distance from the end joint of two veneer planks in the row before the previous row.

Figure 6:
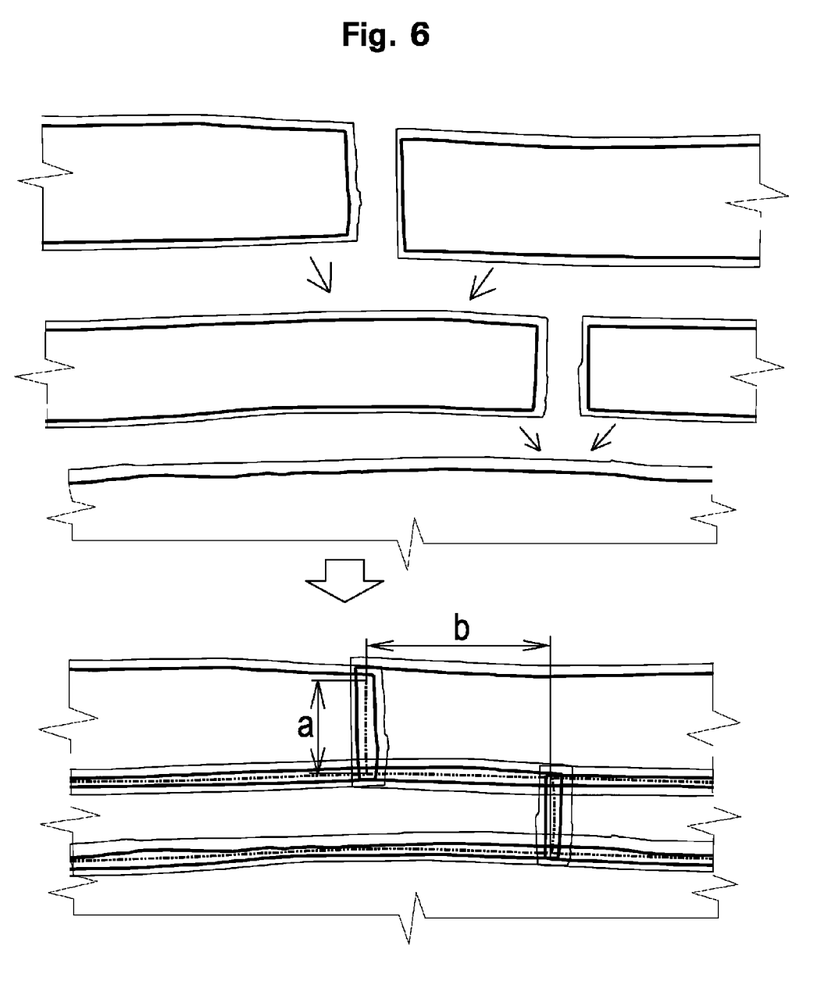
FIG. 6 shows formation of the vertical cutting line (double point dashed line) along the shorter edge into an overlap area of veneer planks. The contours of veneer planks are shown separately on the left of FIG. 6 whereas on the right of FIG. 6 these are shown as overlapping contours of veneer planks. Additionally a "free-hand-straight principle" can be seen as a characteristic feature, when the cutting line connecting the shorter sides of the veneer planks is a curve, which at first glance looks like a freely maid straight line to achieve a natural look.

FIG. 6 shows values a and b, which indicate the distance and width of the cutting lines respectively.

Said operations are repeated for every next row of the veneer planks until the whole floor area is covered.

Next for every overlap area of the adjacent veneer planks on the edges of adjacent veneer planks a common cutting line is generated.

For the overlap area of the ends of two subsequent veneer planks in the same row a common cutting line is also generated.

The acquired set of veneer planks with the cutting lines generated is displayed for the operator on the screen who preferably has an option to intervene manually in the results of the automatic selection process of veneer planks for the rows and when required, for one or more rows make the selection of veneer planks for the process manually.

If need be, the operator can also manually correct the shape and path of the automatically generated cutting lines. When required, the operator can also manually correct the position of cutting line of the ends of two subsequent veneer planks in the same row.

The opportunity of manual intervention by the operator is necessary to enable in case of a more complex shape of the floor perimeter to choose veneer planks with a different shape instead of the veneer planks selected automatically by the control program either for the purpose of other technical considerations (for example the position of the door openings, chimneys, posts, etc.) or for purely aesthetic aspect.

When the set of veneer planks with all the cutting lines is determined, next for every single veneer plank substrate is generated in the shape corresponding to the cutting lines of the veneer plank.

Thereby for forming a tongue-and-groove joint an additional material portion is added at least into one longer edge and into one shorter edge of the substrate. All the cutting lines for the veneer planks and for their substrates are stored for CAM processing.

Thereafter the substrate material is calibrated, for example, by planing and to one side of the substrate a compensating groove is made when needed.

After that for every veneer plank a substrate is cut out.

The corresponding veneer planks and substrates are subsequently glued together by placing a veneer plank and its substrate in the correct position in relation to each other with the help of the contour from the laser or image projector.

When glue has set, the edges of every single veneer plank and its substrate glued together is cut in the CNC cutting machine according to the previously determined cutting lines. In other words, the edges of a veneer plank and its substrate glued together are cut in such a way that the obtained floorboards are ready to be assembled on the floor, and in the course cutting of the substrate part of every floorboard into one edge of the substrate a tongue and into the other edge a groove is cut.

Every ready floorboard is labelled.

After the set of floorboards has been cut and ready, optionally a so-called floor inspection is performed by laying floorboards on a special base or on the floor of the corresponding manufacturing space. Simultaneously a quality checking and when needed also so-called post-puttying is performed (for example to smooth knot spots or other gaps revealed in the process).

Thereafter the laid floor is disassembled and polished.

This is followed by wrapping ready floorboards into the plastic film and packaging for transport.

Optionally, prior to wrapping by film and packaging, in order to touch up the floorboards, brushing and oiling thereof along with a quality checking takes place.

It is obvious to the person skilled in the art that the invention is not limited to the exemplary embodiments described above, but within the scope of the attached claims many other embodiments of the inventions are conceivable.

It is clear to the person skilled in the art that the invention is not limited to the exemplary embodiments described above, but within the scope of the attached claims many other embodiments of the inventions are possible.

The invention claimed is:

1. A method for producing a laminate floorboard with edges following the natural curvature of timber planks, the method comprising:
   in step a) scanning contour data and images of the timber planks into a computer database, wherein unedged timber planks having natural edge curvature are used, said data comprising at least the length, width, thickness, and edge contours of the timber planks and step a) further comprises cutting the timber planks lengthwise into veneer planks having equal thickness,
   in step b) generating a preliminary layout array of the veneer planks defining a number of rows of veneer planks to cover a floor area and a preferred width of the veneer planks for each row,
   in step c) generating on the basis of the contour data of the edges of the veneer planks a set of veneer planks with edges having natural curvature for covering the floor area, wherein the edge contour of each row of veneer planks is matched with the edge contour of a previous row according to a minimal and maximum overlap determined by the preliminary layout array, and wherein ends of the veneer planks in each row are matched according to the minimal and maximum overlap,
   in step d) generating a common cutting line on the edges of adjacent veneer planks in an overlap area of each adjacent row of veneer planks while the adjacent veneer planks are disposed adjacently in an overlapping manner, and generating a cutting line on the ends of the veneer planks in each row of veneer planks in an overlap area of the ends of two consecutive veneer planks,
   in step e) generating for each veneer plank a substrate that follows the contours of the veneer plank determined by the cutting lines on the edges and the ends of the veneer plank, and adding an additional material into at least one longer edge and at least one shorter edge of the substrate for forming a tongue-and-groove joint,
   in step f) cutting a substrate for each veneer plank having the shape generated in step e),
   in step g) gluing together each veneer plank and the corresponding cut-out substrate to create the laminate floorboard, and
   in step h) cutting the edges of each laminate floorboard so that the edges of the veneer plank follow the cutting lines on the edges and ends generated in step d) and cutting into the longer edges of the substrate a corresponding tongue and groove following the cutting line of the substrate for mutual joining of laminate floorboards along their cutting lines.

2. The method according to claim 1, wherein plywood, fibreboard, or chipboard are used as the substrate.

3. The method according to claim 1, wherein in step c) in each row the ends of the veneer planks are matched according to the minimal and maximum overlap so that a junction of the ends of the veneer planks in a next row is not closer to a junction of the ends of the veneer planks in a previous row than a width of butting ends of the previous row of the veneer planks.

4. The method according to claim 1, wherein in step a) said data further comprises the contour of bark, pith, heartwood, and wane of the timber planks and wood defects.

5. The method according to claim 1, wherein in step a) the length, width, thickness and contour of the timber planks includes bark, pith, heartwood, wane, and defects of the timber planks.

6. The method according to claim 1, wherein veneer planks having natural edge curvature are used in step a) and step a) comprises scanning the contour data and images of the veneer planks into the computer database, said data comprising at least the length, width, thickness, and edge contours of the veneer planks.

7. The method according to claim 1, wherein step b) is repeated for every row of veneer planks until the floor area is covered.

8. The method according to claim 1, wherein each of the timber planks cut lengthwise in step (a) comprises a sapwood region around a periphery of the timber plank and a heartwood region disposed within the sapwood region, and wherein the cutting lines generated in step (d) is within an overlap region where respective heartwood regions of adjacent veneer planks overlap.

9. A method for producing laminate floorboards with edges following the natural curvature of timber planks, the method comprising:
   scanning contour data of at least the length, width, thickness, and edge contours of timber planks into a computer database,
   generating a set of digital timber planks with edges having natural curvature for covering a floor area, wherein the edge contour of each row of timber planks is matched with the edge contour of a previous row according to a minimal and maximum overlap determined by a preliminary layout array, and wherein ends of the timber planks in each row are matched according to the minimal and maximum overlap,
   generating a common cutting line on the edges of adjacent digital timber planks in an overlap area of each adjacent row of timber planks while the adjacent digital timber planks are disposed adjacently in an overlapping manner, and generating a common cutting line on the ends of the timber planks in each row of timber planks in an overlap area of the ends of two consecutive timber planks,
   cutting the edges of each timber plank so that the edges of the timber plank follow the cutting lines on the edges and ends.

10. The method according to claim 9 further comprising, prior to the step of generating a common cutting line, generating a preliminary layout array of the timber planks defining a number of rows of timber planks to cover a floor area and a preferred width of the timber planks for each row based on an inventory status of the timber planks in the computer database according to at least one parameter comprising width classes of the timber planks and aesthetic parameter of the timber planks.

11. The method according to claim 9, wherein each of the timber planks cut lengthwise comprises a sapwood region around a periphery of the timber plank and a heartwood region disposed within the sapwood region, and wherein the cutting lines generated are within an overlap region in which respective heartwood regions of adjacent veneer planks overlap.

* * * * *